United States Patent
Winters

(10) Patent No.: US 10,925,120 B2
(45) Date of Patent: Feb. 16, 2021

(54) MIRROR DEFOGGER

(71) Applicant: Wintervention, LLC, Princeton, NJ (US)

(72) Inventor: Frank Winters, Princeton, NJ (US)

( * ) Notice: Subject to any disclaimer, the term of this patent is extended or adjusted under 35 U.S.C. 154(b) by 176 days.

(21) Appl. No.: 16/261,190

(22) Filed: Jan. 29, 2019

(65) Prior Publication Data

US 2019/0159297 A1     May 23, 2019

Related U.S. Application Data

(63) Continuation-in-part of application No. 15/447,577, filed on Mar. 2, 2017, now Pat. No. 10,225,887.
(Continued)

(51) Int. Cl.
*H05B 1/02*     (2006.01)
*H05B 3/84*     (2006.01)
(Continued)

(52) U.S. Cl.
CPC ............. *H05B 3/845* (2013.01); *F24H 3/002* (2013.01); *F24H 3/0405* (2013.01);
(Continued)

(58) Field of Classification Search
CPC ........... H05B 3/845; H05B 1/02; F24H 3/002; F24H 3/0405; F24H 9/0057;
(Continued)

(56) References Cited

U.S. PATENT DOCUMENTS

| 1,465,292 A | 8/1923 | Wessig |
| 2,121,753 A | 6/1938 | Cornell, Jr. |

(Continued)

FOREIGN PATENT DOCUMENTS

| CN | 2779785 | 5/2006 |
| CN | 201015510 | 2/2008 |

(Continued)

OTHER PUBLICATIONS

Knotts, Steve, Active Bathroom Mirror Defogger, KICKSTARTER Website, https://www.kickstarter.com/projects/1511132316/active-bathroom-mirror-defogger, Mar. 19, 2015.

*Primary Examiner* — Mark H Paschall

(74) *Attorney, Agent, or Firm* — Werschulz Patent Law, LLC; Patricia P. Werschulz, Esq.

(57) ABSTRACT

An adaptable system for defogging a mirror in a steamy bathroom having a tube assembly with a plurality of openings with an impeller and a plurality of heating elements for blowing hot air through the openings onto the fogged mirror. In one example embodiment, the tube assembly has louvers directing the hot air from the openings. The system has a plurality of mounting assemblies configured for all types of mirrors operative for coupling to the tube assembly, such as a portable mounting assembly with a rechargeable battery that selectively attaches on or adjacent to a mirror. The system has an articulated arm mounting assembly in one example embodiment. The system has a mounting assembly fixture in another example embodiment. A kit comprises the tube assembly and at least one mounting assembly.

6 Claims, 21 Drawing Sheets

Related U.S. Application Data which is a continuation-in-part of application No. 14/688,021, filed on Apr. 16, 2015, now Pat. No. 9,612,035.

(51) Int. Cl.
  *F24H 3/00* (2006.01)
  *F24H 9/00* (2006.01)
  *F24H 3/04* (2006.01)
  *F24H 9/06* (2006.01)

(52) U.S. Cl.
  CPC ......... *F24H 9/0057* (2013.01); *F24H 9/0063* (2013.01); *F24H 9/06* (2013.01); *F24D 2220/04* (2013.01); *F24D 2220/042* (2013.01); *H05B 2203/022* (2013.01)

(58) Field of Classification Search
  CPC ...... F24H 9/0063; F24H 9/06; F24H 2220/42; F24H 2220/022
  USPC .......................... 219/202, 203, 219, 509, 497
  See application file for complete search history.

(56) References Cited

U.S. PATENT DOCUMENTS

| | | | |
|---|---|---|---|
| 2,617,701 A | 11/1952 | Fennell | |
| 3,530,275 A | 9/1970 | Rust | |
| 4,037,079 A | 7/1977 | Armbruster | |
| 4,150,869 A | 4/1979 | Hansen | |
| 4,366,368 A | 12/1982 | Stephens | |
| 4,369,352 A * | 1/1983 | Bowles | F24C 14/02 219/395 |
| 4,594,797 A | 6/1986 | Houck | |
| 4,653,201 A | 3/1987 | Seaman | |
| 4,701,594 A | 10/1987 | Powell | |
| 4,882,467 A | 11/1989 | Dimick | |
| 4,988,847 A | 1/1991 | Argos et al. | |
| 5,063,283 A | 11/1991 | Orazi | |
| 5,251,066 A | 10/1993 | Appelbaum | |
| D347,275 S | 5/1994 | Lovell | |
| 5,467,423 A * | 11/1995 | Jakubowski | A47G 1/02 15/250.03 |
| D372,773 S | 8/1996 | Young | |
| 5,642,462 A | 6/1997 | Huff | |
| 5,731,569 A | 3/1998 | Crescenzo | |
| 5,731,769 A * | 3/1998 | Girardeau, Jr. | H03M 3/462 341/61 |
| 5,987,216 A | 11/1999 | Krug | |
| 6,100,500 A | 8/2000 | Jefferson, Jr. et al. | |
| 6,112,135 A * | 8/2000 | Peterson | G05B 9/02 700/209 |
| 6,653,606 B1 * | 11/2003 | Son | H05B 3/84 219/203 |
| 6,862,893 B1 * | 3/2005 | Wang | B60H 1/00785 236/44 C |
| 7,267,462 B2 | 9/2007 | Cronin | |
| 8,420,985 B2 | 4/2013 | Dallaire | |
| 8,899,803 B2 * | 12/2014 | Marley | F21S 41/153 362/516 |
| 9,359,878 B2 * | 6/2016 | Whitney | E21B 43/36 |
| 2001/0050274 A1 | 12/2001 | Decker | |
| 2007/0158335 A1 * | 7/2007 | Mansbery | F24C 7/082 219/505 |
| 2011/0168687 A1 | 7/2011 | Door et al. | |
| 2014/0200742 A1 * | 7/2014 | Mauti, Jr. | F02D 29/02 701/2 |

FOREIGN PATENT DOCUMENTS

| | | |
|---|---|---|
| CN | 201131544 | 10/2008 |
| CN | 203059088 U | 7/2013 |
| FR | 2566650 A1 | 1/1986 |
| WO | 1990006707 A1 | 6/1990 |

\* cited by examiner

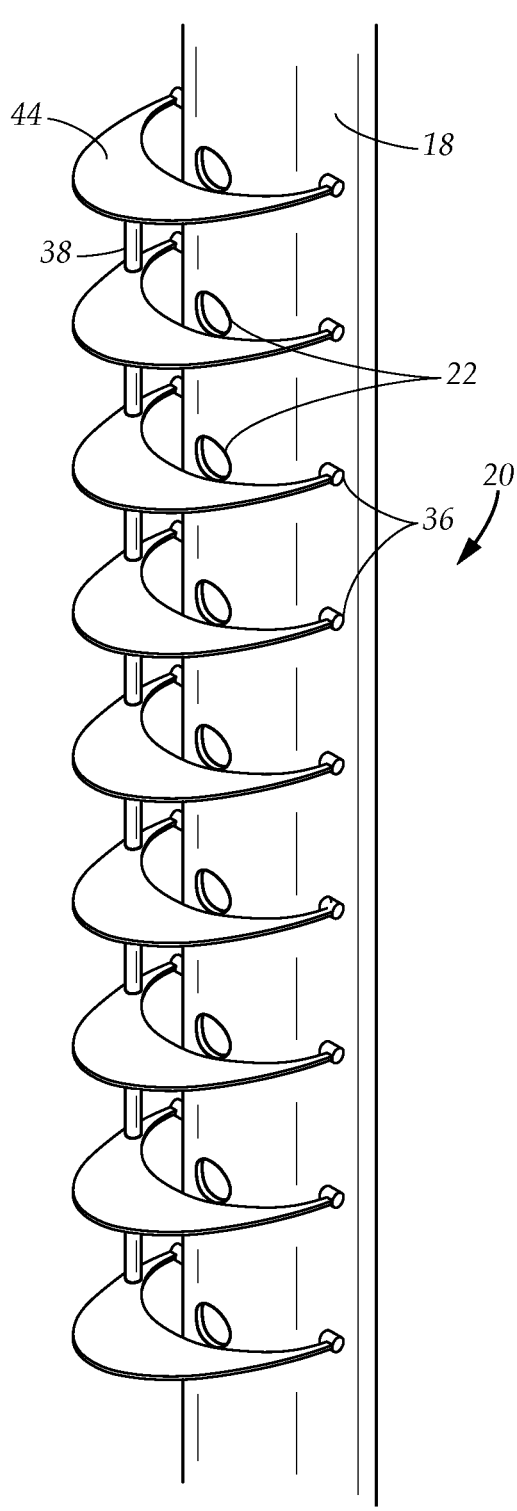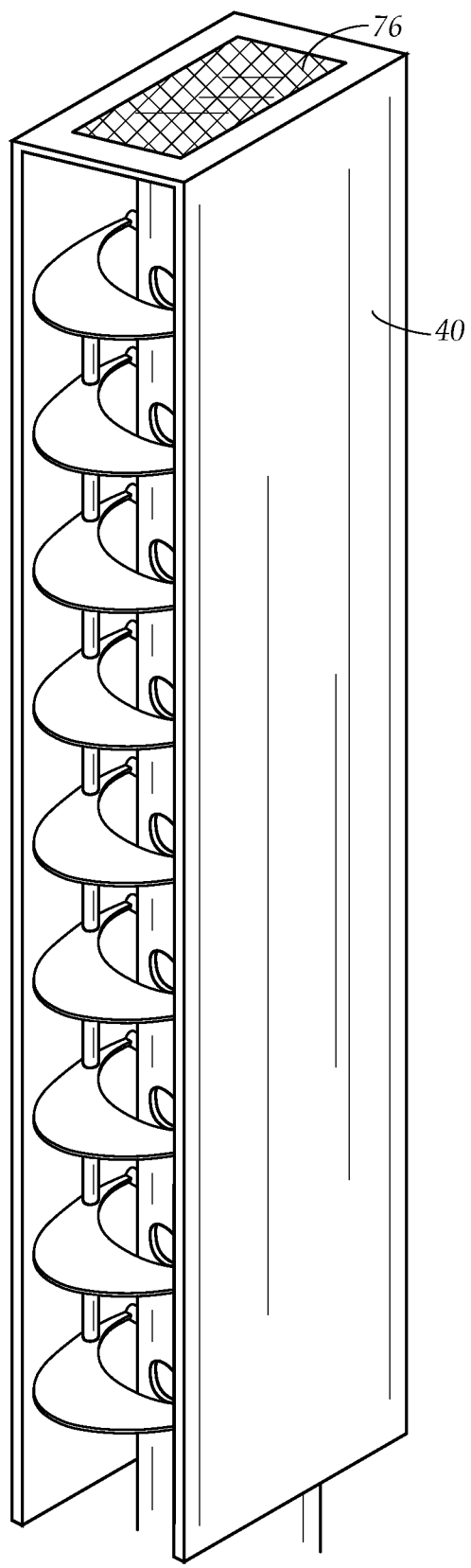
FIG. 3A
FIG. 3B

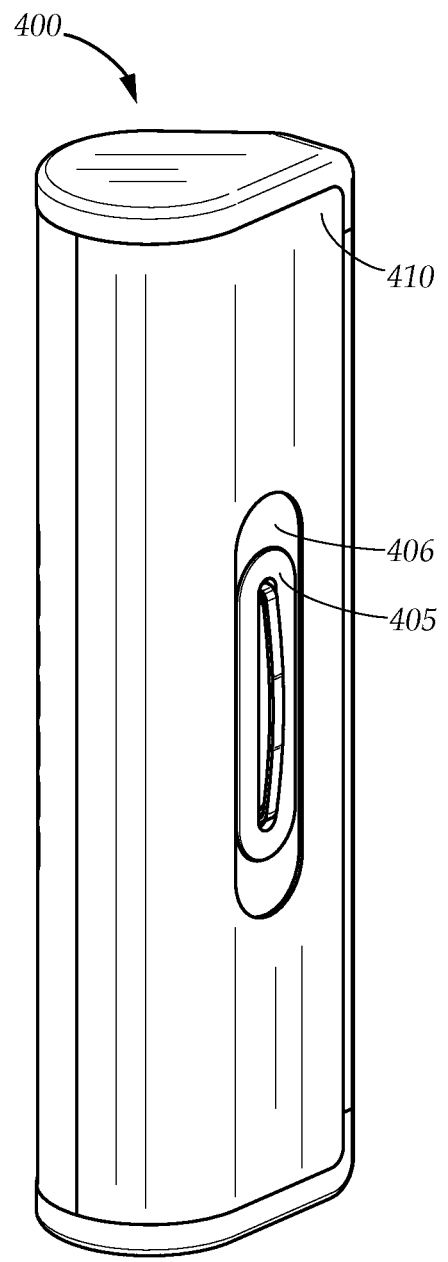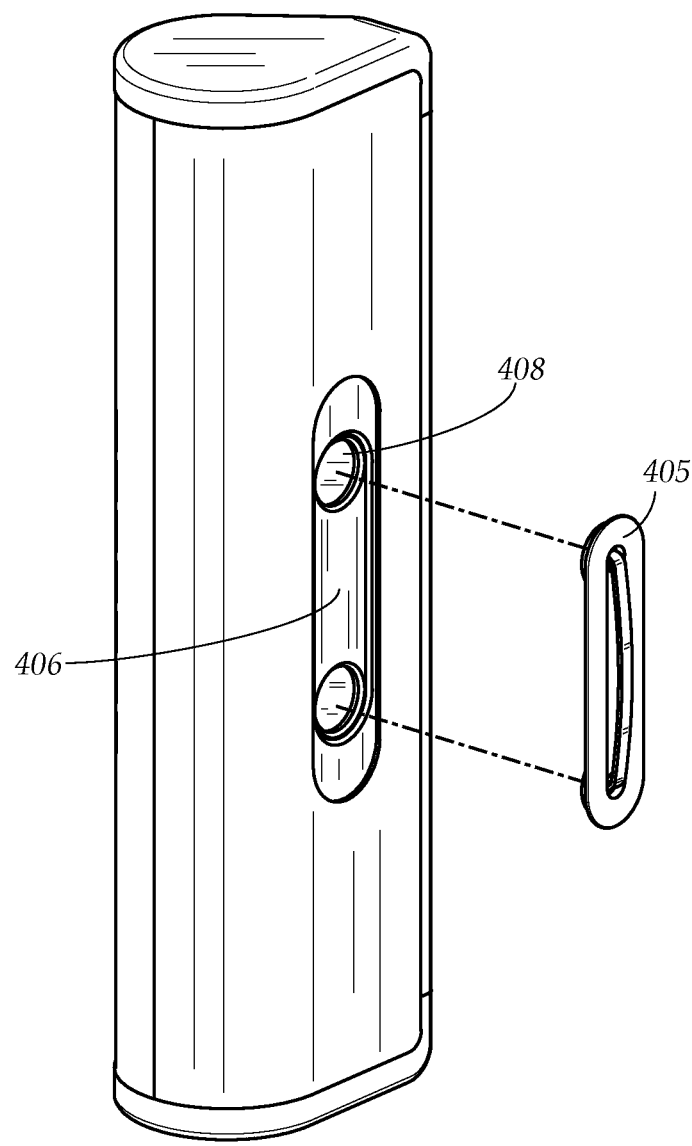
FIG. 20A
FIG. 20B

MIRROR DEFOGGER

CROSS-REFERENCE TO RELATED APPLICATIONS

This application is a continuation-in-part nonprovisional utility application of the non-provisional utility application Ser. No. 15/447,577 filed on Mar. 2, 2017 in the United State Patent and Trademark Office which is a continuation-in-part of the non-provisional utility application Ser. No. 14/688,021, filed in the United States Patent and Trademark Office on Apr. 16, 2015, now U.S. Pat. No. 9,612,035, and claims the priority thereof and is expressly incorporated herein by reference in its entirety.

TECHNICAL FIELD

The present disclosure relates generally to a mirror defogger. More particularly, the present disclosure relates to a mirror defogging system.

BACKGROUND

Bathroom mirrors fog, that is, become covered with condensed water vapor, when a nearby shower or bath is running. Generally, the entire room becomes steamy and remains steamy for a period after the shower or bath. The mirror is usually the last surface from which the steam disappears.

Unfortunately, a fogged mirror is useless for shaving, applying makeup, styling hair and all those tasks that are required by a person to look presentable when preparing for the day's or evening's events.

People are impatient and have tried many things to either prevent the problem of mirror fogging or to quickly remedy it. Ceiling fans, exhaust fans and hair dryers are often employed with limited success. The ceiling fans and exhaust fans clear the steam in general but do little to remove the fog on the mirror. If the surface of the mirror is cooler than room temperature, the moisture will continue to condense on the mirror surface.

A popular trick is to apply a hair dryer to the mirror. However, the hair dryer has a single focal point of hot air. The hair dryer heats relatively small areas on the surface of the mirror and it is a slow, tedious process. Often the mirror starts to fog over again before the user is finished removing the fog.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system for defogging a mirror in a steamy bathroom. Accordingly, an aspect of an example embodiment in the present disclosure provides a tube assembly with an impeller and a plurality of heating elements for blowing hot air onto a fogged mirror.

Another aspect of an example embodiment in the present disclosure is to provide a system for defogging a mirror that is adaptable. Accordingly, the present disclosure provides a system for defogging a mirror that has a plurality of mounting assemblies for a tube assembly for blowing hot air on a fogged mirror, the mounting assemblies configured for all types of mirrors.

A further aspect of an example embodiment in the present disclosure is to provide a portable system for defogging a mirror. Accordingly, the present disclosure provides a system that has a tube assembly for blowing hot air on a fogged mirror and a portable mounting assembly with a rechargeable battery that selectively attaches on or adjacent to a mirror.

Accordingly, the present disclosure describes an adaptable system for defogging a mirror in a steamy bathroom. The system has an impeller and a plurality of heating elements in a tube assembly for blowing hot air on the fogged mirror. In one example embodiment, the tube assembly has louvers. The system has a plurality of mounting assemblies configured for all types of mirrors coupled to the tube assembly for blowing hot air on a fogged mirror, such as a portable mounting assembly with a rechargeable battery that selectively attaches on or adjacent to a mirror. The system has an articulated arm mounting assembly in one example embodiment. The system has a mounting assembly fixture in another example embodiment. A kit comprises the tube assembly and at least one mounting assembly.

The present disclosure addresses at least one of the disadvantages of the prior art. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 3A is a perspective view of another example embodiment of a tube assembly.

FIG. 3B, similar to FIG. 3A, is a perspective view of another example embodiment of the tube in a mounting box assembly.

FIGS. 20A-20B are perspective views of yet a further example embodiment of a tube assembly of a mirror defogger.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 7:
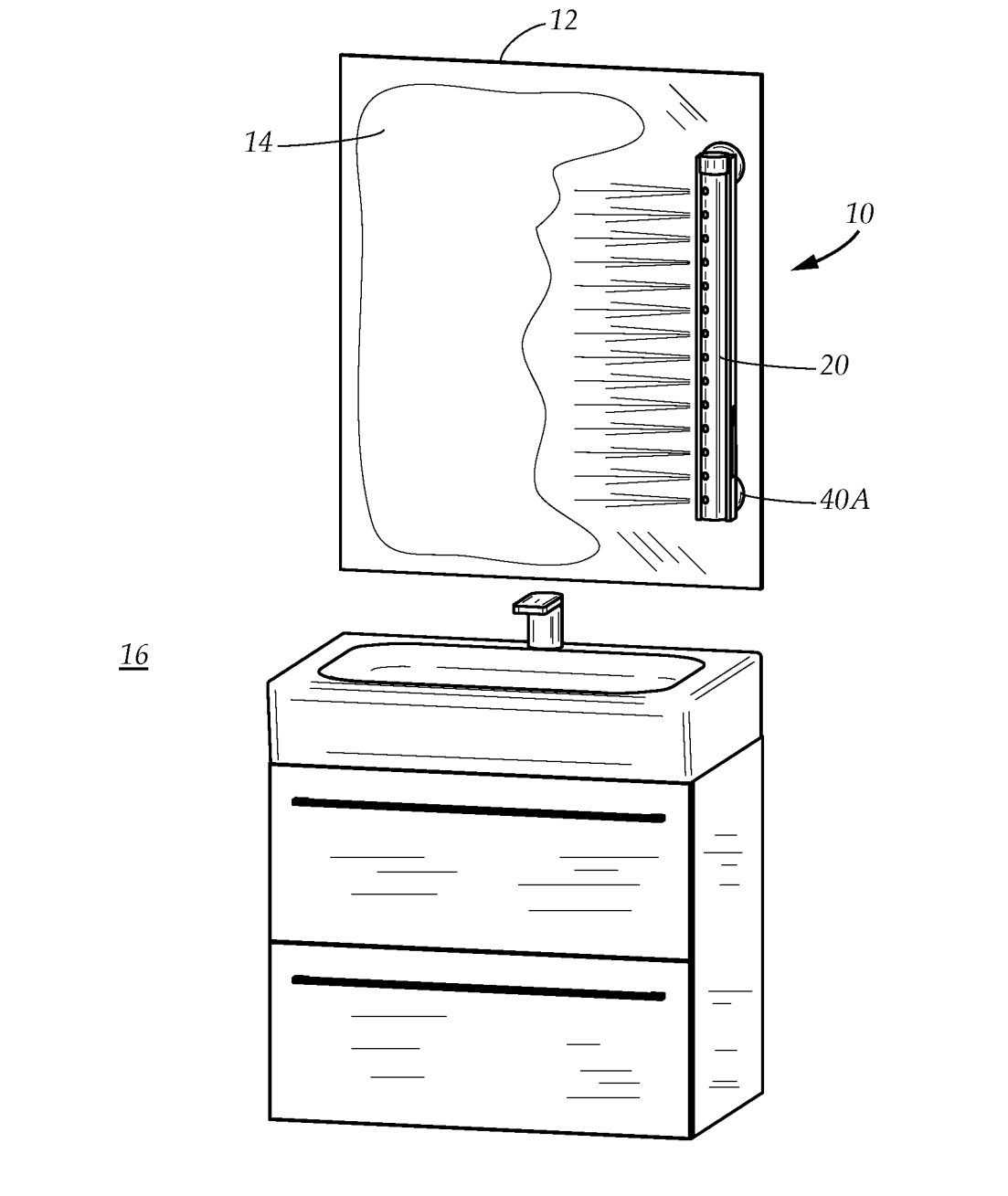
FIG. 7 is a perspective view of an example embodiment of the mirror defogger system defogging a mirror.

FIG. 7 illustrates an example embodiment of a mirror defogging system 10 configured for defogging a mirror 12 by eliminating condensate 14 from the mirror surface. In a typical bathroom as illustrated in FIG. 7, the mirror 12 hangs on a wall 16. However, it is understood that other configurations are possible, such as a free-standing mirror on a pedestal, a mirror attaching to the wall by an accordion mount or an articulated arm. As explained below, the mirror defogging system is configured to defog mirrors in various configurations and is not limited to a wall-mounted mirror 12.

The mirror defogging system 10 has a tube assembly 20 selectively coupling to a mounting assembly 40 described in detail hereinbelow. The mirror defogging system has a plurality of mounting assemblies adaptable for portability as well as various configurations of mirrors. The mounting assembly 40A in FIG. 7 is a first example embodiment of possible mounting assemblies. The mounting assembly 40A receives the tube assembly 20, positioning the tube assembly 20 on or in proximity to the mirror 12. All the mounting assemblies described herein are configured to receive the tube assembly 20.

Figure 1:
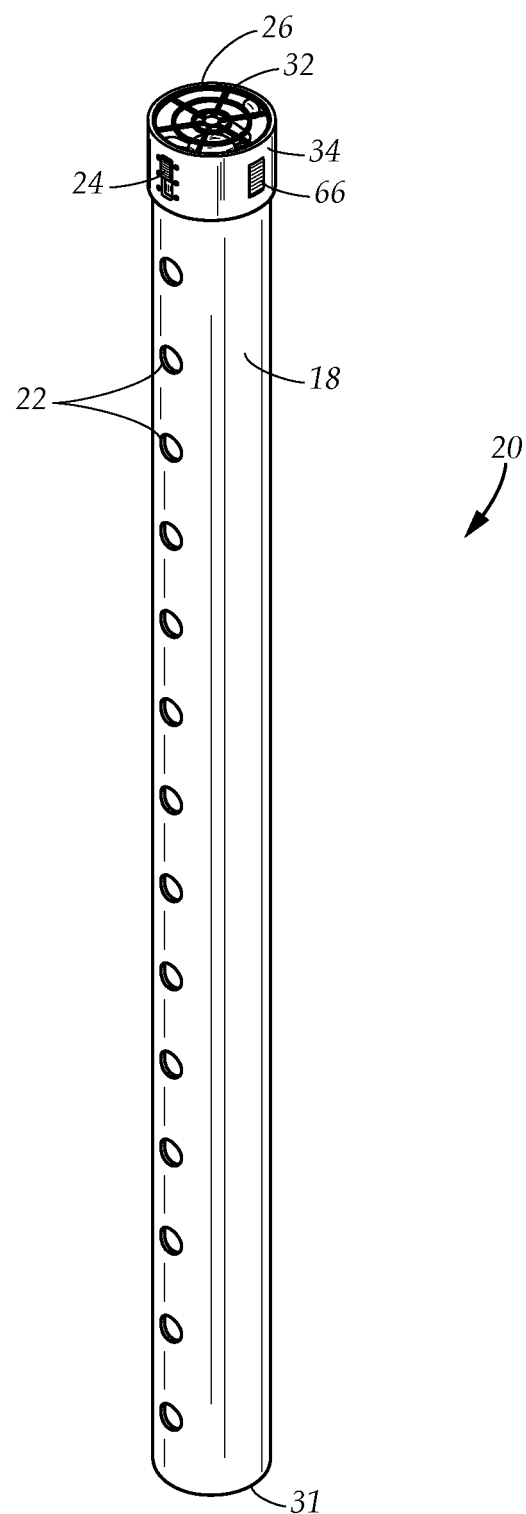
FIG. 1 is a perspective view of an example embodiment of a tube assembly of a mirror defogger.

FIG. 1 illustrates an example embodiment of the tube assembly 20 in detail. The tube assembly 20 has a tube 18 with an open end 32 and a closed end 31. The tube 18 has a plurality of longitudinally recurring openings 22. In one example embodiment, the openings 22 are in a linear arrangement. However, it is understood that other longitudinal patterns are possible within the inventive concept.

The open end 32 of the tube 18 has a collar 34 encircling the open end. The open end 32 is covered by an open grill 26 to prevent accidents.

On the collar 34 are at least one electrical contact 66 and at least one switch 24. The at least one switch 24 has a plurality of settings such as "ON," "OFF," "AUTO," "HIGH," and "LOW," as non-limiting examples.

Figure 2:
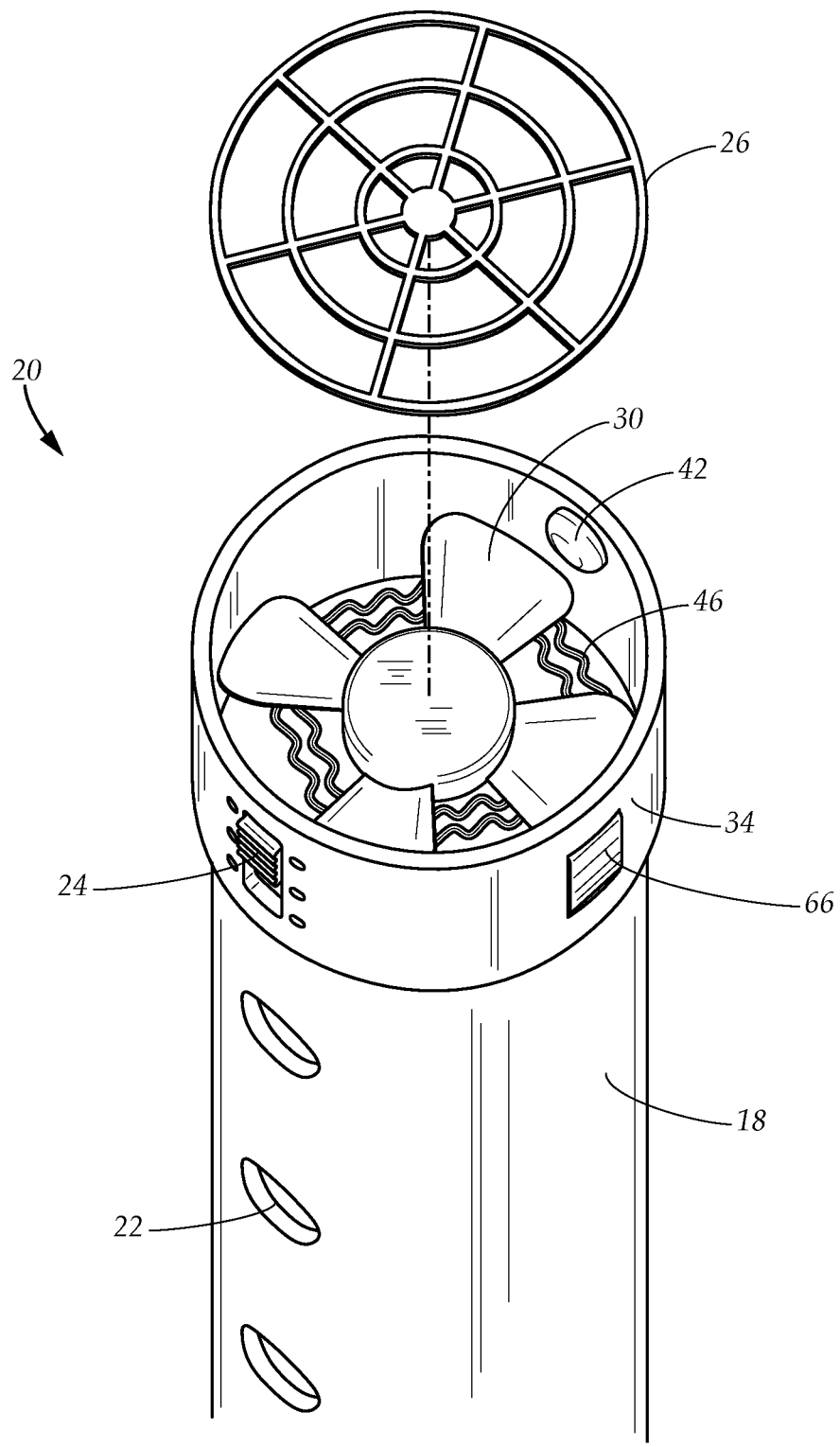
FIG. 2 is an exploded perspective view of a top of the example embodiment of the tube assembly, showing interior features.

FIG. 2 shows the open end 32 of the tube 18 in greater detail. The tube 18 has an impeller 30 and a plurality of heating elements 46 towards the open end 32 of the tube 18. The impeller 30 is powered by an electrical motor that is not shown. In one example embodiment, the impeller 30 has a variable speed motor. The at least one contact 66 electrical couples the tube assembly 20 to the mounting assembly to power the impeller 30 and heating elements 46. The impeller 30 and the heating elements 46 blowing heated air through the openings 22 for defogging the mirror. In a further example embodiment, the impeller 30 is an axial impeller having an axis of rotation orthogonal to the tube 18.

The tube assembly 20 has a sensor 42, shown in the illustration inside the collar 34, but the sensor 42 can be anywhere in or on the tube assembly 20 or anywhere in or on the mirror defogging system, and the location on the collar 34 is not a limitation. The sensor 42 can be a moisture sensor that detects the presence of condensate, a humidity sensor or a heat sensor. The sensor 42 initiates the impeller 30 and heating elements 46 when pre-set conditions are sensed and terminates the impeller 30 and heating elements 46 when the pre-set conditions no longer exist and are no longer sensed. In one example embodiment, the sensor functions when the at least one switch 24 is in "AUTO" setting.

In a further example embodiment, the collar 34 and the grill 26 form a resonator to reduce noise of the impeller 30.

In yet another example embodiment, the grill 26 is configured to maintain a scent sachet that produces aromatherapy when the heating elements 46 are on.

FIG. 3A show a further example embodiment of the tube assembly 20 comprising a plurality of adjustable louvers 44 adjacent to the openings 22 on the tube 18. The louvers 44 are operative for directing heated air onto the fogged mirror. The louvers 44 hingedly connect to the tube 18, having a pair of pivots 36 attaching each louver 44 to the tube 18, one pivot on each end of the louver, allowing the louvers to adjust the airflow. In one example embodiment, the louvers 44 are coupled by a bar 38 to move simultaneously. It should be noted that in the other illustrations, the louvers are not shown for the sake of clarity. It should be understood that the louvers 44 optionally can be coupled to the tube assembly 20 in each of the example embodiments described herein.

FIG. 3B illustrates an example embodiment of a mounting assembly 40 as an installed fixture. The mounting assembly 40 is configured for receiving the tube assembly 20. The tube assembly 20 selectively couples to the mounting assembly 40. The mounting assembly 40 is operative for positioning the tube assembly 20 on or in proximity to the fogged mirror. The tube assembly 20 is electrically coupled to the mounting assembly 40, operative for powering the tube assembly impeller and tube assembly heating elements described hereinabove.

In one example embodiment, the mounting assembly 40 has a wireless speaker 76 for transmitting music or audio programs to enhance the lavatory experience.

Figure 4:
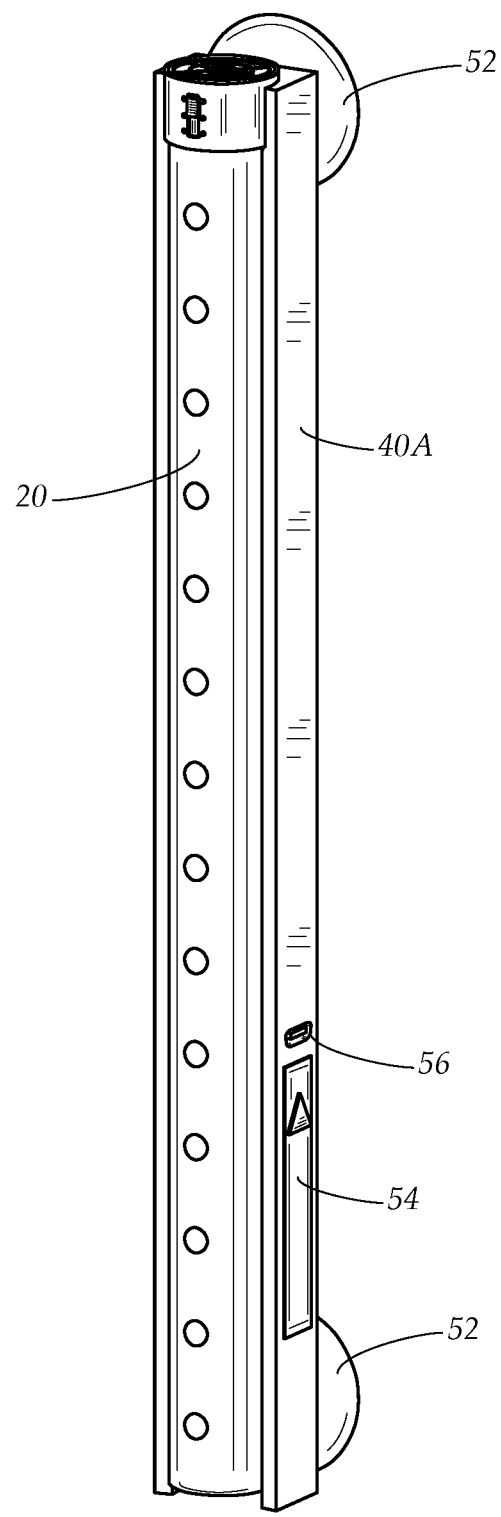
FIG. 4 is a perspective view of a further example embodiment of a portable mounting assembly coupled to the tube assembly.

In FIG. 4, another example embodiment of the mounting assembly 40A is illustrated. The mounting assembly 40A is portable and can be selectively mounted on or adjacent to a mirror as needed. The tube assembly 20 couples to the mounting assembly 40A by snapping in and out of the mounting assembly 40A. The tube assembly 20 is electrically coupled to the mounting assembly 40A, operative for powering the tube assembly impeller and tube assembly heating elements described hereinabove. The mounting assembly 40A has a battery compartment 54 housing a rechargeable battery and a charging port 56. In the illustration, the mounting assembly 40A mounts on or adjacent to the mirror by a plurality of suction cups 52 as a non-limiting example. Other attachment means are possible within the inventive concept.

Figure 5:
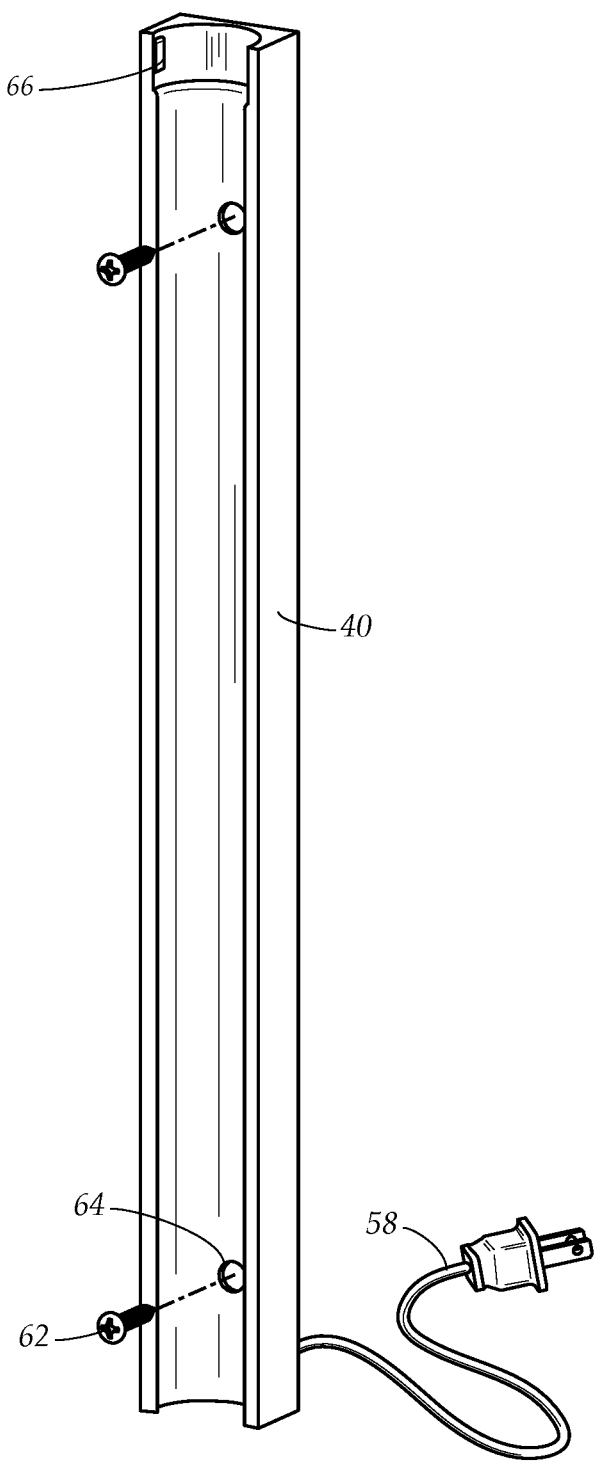
FIG. 5 is a perspective view of an example embodiment of the mounting box assembly.

FIG. 5 shows the mounting assembly 40 for permanent installation of the fixture adjacent to the mirror. As shown in the drawing as a non-limiting example embodiment, the mounting assembly attaches by a plurality of fasteners 62 through a plurality of mounting holes 64. The mounting assembly 40 has the at least one contact 66 configured for electrically coupling the fan assembly to the mounting assembly 40 and a power supply 58, such as a plug as a non-limiting example, for electrically connecting the mounting assembly 40 to electrical current. In other example embodiments, the mounting assembly 40 is wired directly to the electrical current.

Figure 6:
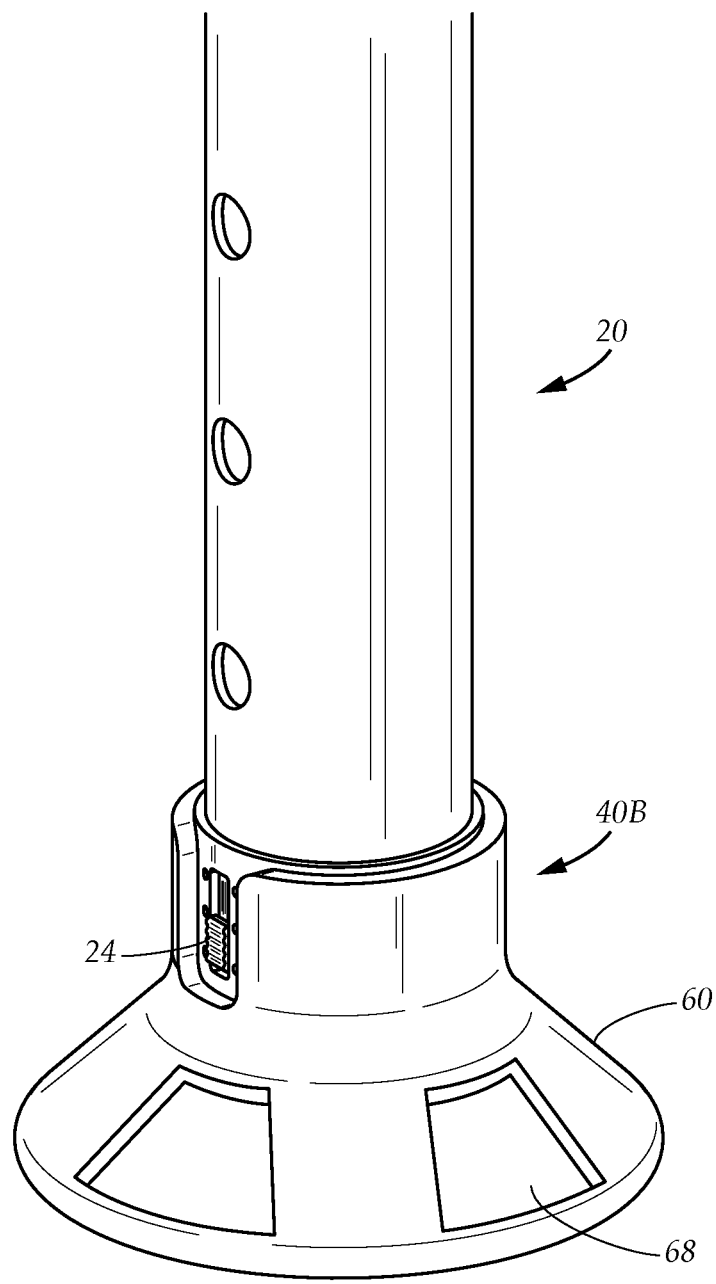
FIG. 6 is a perspective view of yet another example embodiment of a mounting base assembly coupled to the tube assembly.

FIG. 6 illustrates another example embodiment of the mounting assembly 40B. The mounting assembly 40B is a receptacle base 60 with a plurality of vents 68. The tube assembly 20 stands upright in the receptacle base 60. Inside the base is the electrical contact, which is not shown. The receptacle base 60 is powered by electrical current or rechargeable battery, as described hereinabove with regard to the other example embodiments of the mounting assembly. The receptacle base 60 has an opening for the at least one switch 24. The mounting assembly 40B is ideally configured for defogging pedestal mirrors.

Figure 8:
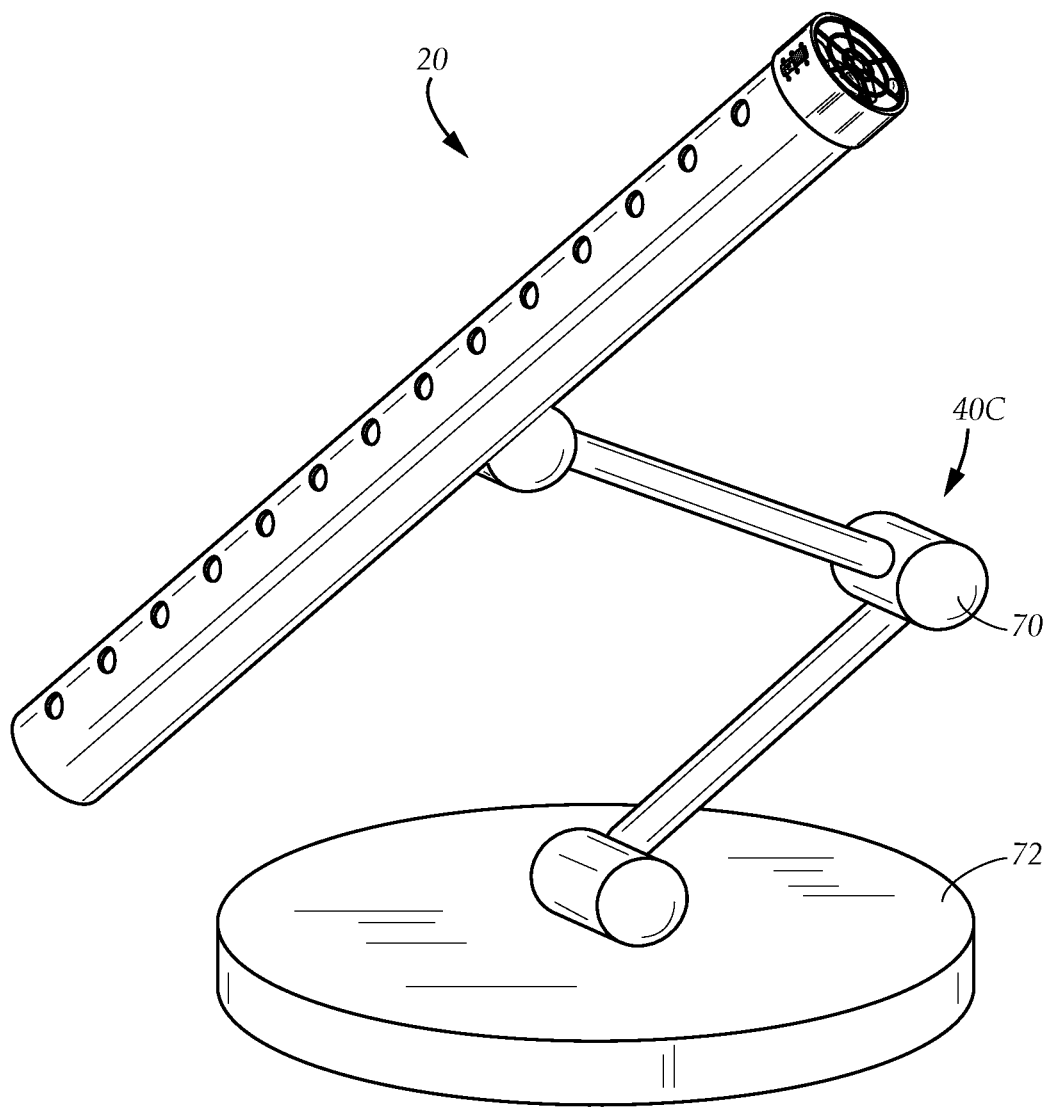
FIG. 8 is a perspective view of a further example embodiment of a mounting stand assembly coupled to the tube assembly.

FIG. 8 demonstrates yet another example embodiment of the mounting assembly 40C. Mounting assembly 40C is an articulated arm 70 on a base 72, operative for positioning the tube assembly 20 in proximity to a fogged mirror from a stowed position. Mounting assembly 40C is useful for all mirror configurations.

The tube assembly 20 electrically couples to the mounting assembly 40C. In one example embodiment, the mounting assembly 40C is manually adjusted for positioning the tube assembly 20 in proximity to the fogged mirror. In a further example embodiment, the articulated arm 70 has a servomotor, which is not shown, that positions the tube assembly 20 in proximity to the fogged mirror. In yet a further example embodiment, the servomotor is initiated by the sensor as explained hereinabove.

The tube assembly 20 is configured to function with the plurality of mounting assemblies described hereinabove. The mirror defogging system 10 shown in FIG. 7 further comprises a kit. In one example embodiment, the kit comprises the tube assembly 20, and at least one mounting assembly, such as the mounting assembly fixture 40 shown in FIG. 5 and the portable mounting assembly 40A. In another example embodiment, the kit further comprises the mounting assembly having an articulated arm 70 shown in FIG. 8. In yet another example embodiment, the kit further comprises the mounting assembly having a receptacle base 60 illustrated in FIG. 6. The kit further comprises a plurality of mounting assemblies.

In another example embodiment, the kit comprises the tube assembly 20 having louvers 44, shown in FIG. 3A, the mounting assembly fixture 40 shown in FIG. 5 and the portable mounting assembly 40A.

Figure 13:
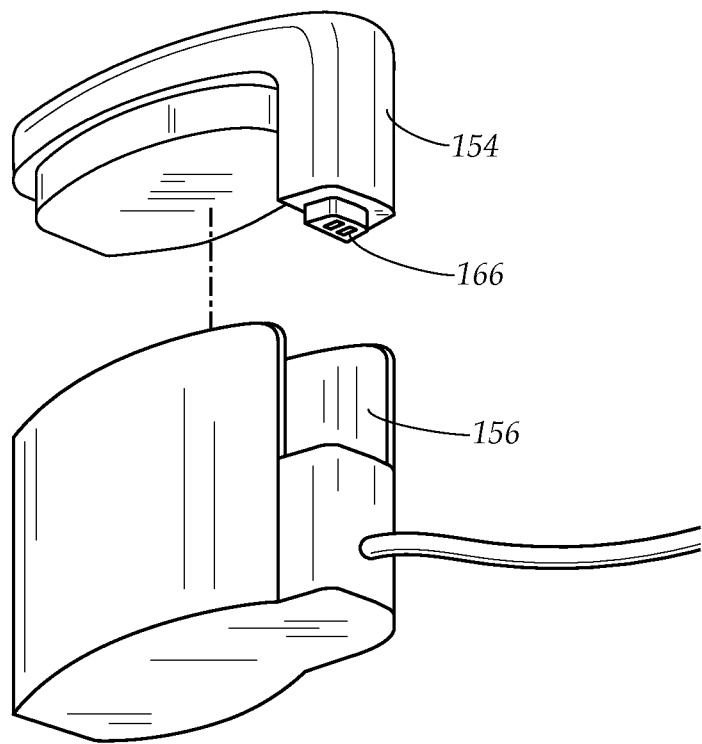
FIG. 13 is a perspective view of a battery compartment.
Figure 14:
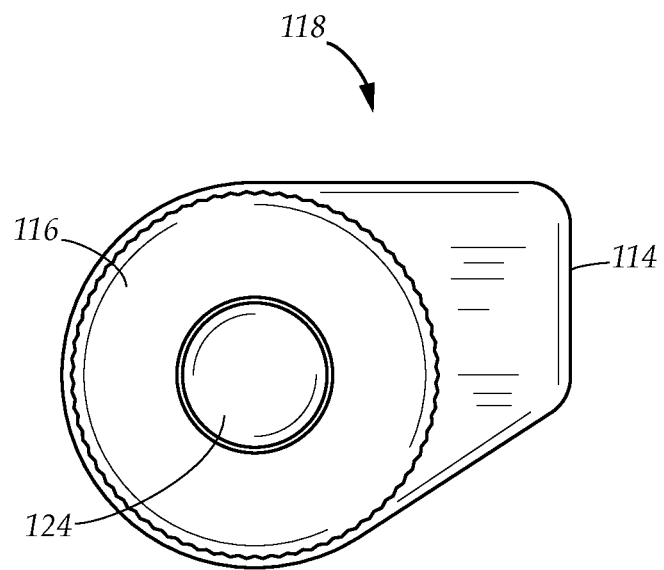
FIG. 14 is a top plan view of yet a further example embodiment of the tube assembly of the mirror defogger.

FIGS. 9, 10, 11, 13 and 14 shows yet a further example embodiment of a mirror defogger 110. The mirror defogger 110 has a tube 120 with a longitudinal axis 112 and an essentially teardrop-shaped cross-section 118 as shown in FIG. 14. The cross-section 118 has a vertex portion 114 and an oblong portion 116. The tube 120 has a vent 122 at the vertex portion 114 of the cross-section 118 along a middle section 128 of the longitudinal axis 112. The tube 120 has an intake grill 126 having a plurality of openings on the oblong portion 116.

Inside the tube 120 is an impeller 130 powered by a motor 142, the impeller inside the tube in the oblong portion 116 is opposite the vent 122. In one example embodiment shown, the impeller is a tangential impeller 130. However, those of ordinary skill in the art understand that a centrifugal or "squirrel-cage" impeller is equally useful in the mirror defogger by a slight change in the position of the openings of the grill 126.

In another embodiment, the motor may be unidirectional.

In another embodiment, the body of the mirror defogging system may have a rectangular, oval, trapezoidal, non-uniform or amorphous cross section. The body may be an elongated projection along an axis, the cross section being perpendicular to the axis. In one example embodiment, the elongated projection is a tube. The body having an intake grill and a vent disposed along the surface of the body, the vent and the intake being nonoverlapping across the cross-section. Proper air flow from the intake grill to the vent may be achieved by creating the proper air pressure differential across the cross section. Proper air pressure differential may be achieved by having the overall surface area of the intake grill being larger than the overall surface area of the vent.

There is at least one heating element 146 inside the tube 120 between the tangential impeller 130 and the vent 122.

There is a programmable controller 150 configured for controlling the motor 142 and the at least one heating element 146. In one example embodiment, the programmable controller is a proportional-integral-derivative (PID) controller with a control loop feedback. The programmable controller 150 is in the firmware or alternatively hardwired onto a printed circuit board assembly.

In one example embodiment, the programmable controller includes communication firmware that allows a user to input through Wi-Fi, Bluetooth® (Bluetooth® is the registered trademark of Bluetooth SIG, INC., Kirkland, Wash.) and other wireless means of communications that are used with software applications such as a "smart home" app found on smartphones and other computing devices.

The disclosed embodiments may individually and/or collectively be components of a larger system, wherein other procedures may take precedence over or otherwise modify their application. Also, a number of steps may be required before, after, and/or concurrently with the embodiments.

Inside the tube 120 there is a plurality of sensors 132, 134, 136, 138 in communication with the programmable controller 150, the sensors outputting a plurality of measurements of conditions outside the tube 120.

A first sensor 132, 134 measures the temperature of the mirror surface and outputs the measurement to the programmable controller 150. In one example embodiment, the first sensor is a contactless infrared temperature sensor 132. in another example embodiment, the first sensor is a direct contact sensor 134 in contact with the mirror surface. It is understood by those of ordinary skill in the art, that the tube has an opening to accommodate the sensor infrared light or the sensor contact, however the opening is not shown in the drawings.

A second sensor 136 outputs a measure of the ambient temperature to the programmable controller 150 and a third sensor 138 outputs a measure of the ambient humidity to the programmable controller 150. In the drawing, the sensors 136,138 are shown in a common housing for the sake of illustration. The exact position of these sensors is not a limitation and are placed in the tube 120 in a position such that the ambient air is in contact with the sensors and the sensors are in communication with the programmable controller 150. The programmable controller 150 determines if the measurements are above or below the ambient dew point.

Figure 11:
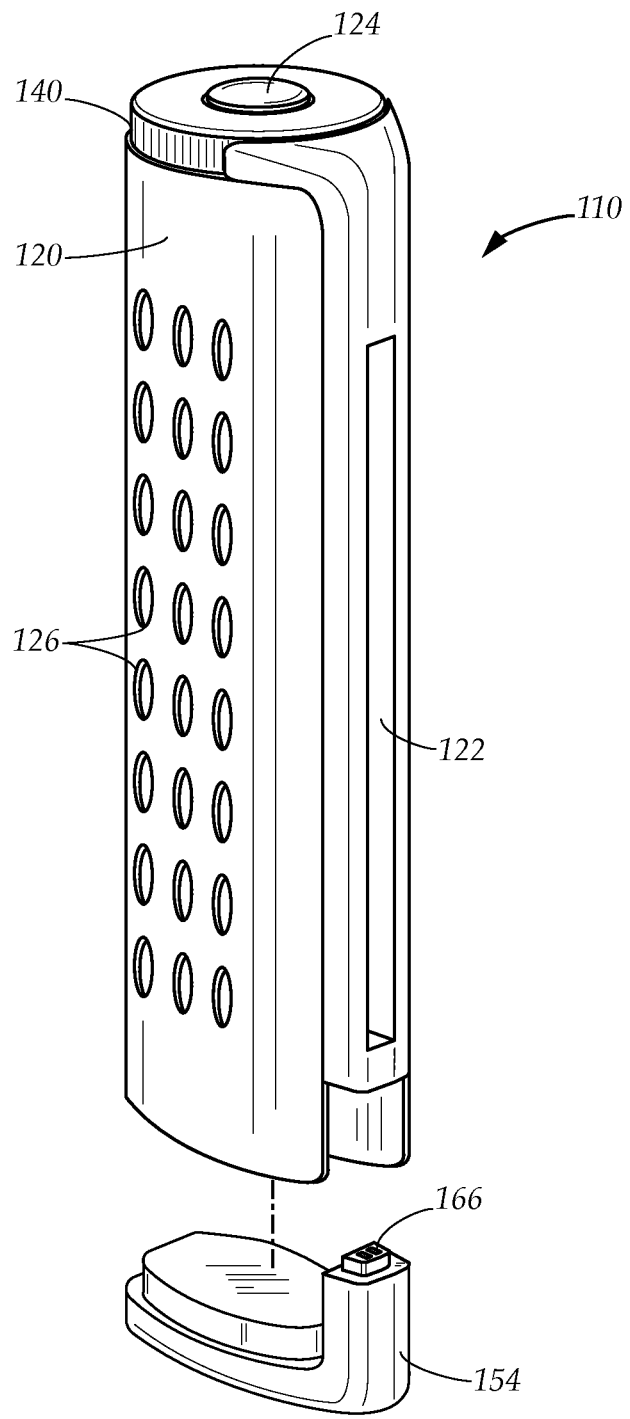
FIG. 11 is a perspective view of the example embodiment of the tube of the mirror defogger with a battery compartment removed.

The motor 142 and the at least one heating element 146 are powered by rechargeable batteries in a battery compartment 154 having a contact point 166. FIG. 11 shows the battery compartment selectively detaching from the tube 120. FIG. 13 shows the battery compartment 154 selectively coupling to a charging station.

The tube attaches to a mirror surface by one of the means disclosed hereinabove, with the vent 122 disposed toward the mirror surface.

The mirror defogger 110 has a dial switch 140 at the top of the tube 120 for setting a time delay as explained herein below.

In the simplest case, the mirror defogger 110 is turned on and off by a user using the switch 124 in manual mode.

As understood by those of ordinary skill in the art, the dew point is the temperature at which the water vapor in air condenses into liquid water at the same rate at which it evaporates. At temperatures below the dew point, the rate of condensation will be greater than that of evaporation, forming more liquid water. The condensed water forms on a solid surface as fog. At temperatures above the dew point, the rate of evaporation is greater than the rate of condensation so that the water vapor remains in the air. Relative humidity of 100% indicates the dew point is equal to the current temperature and that the air is maximally saturated with water. The higher the temperature, the more moisture is required to saturate the air with water. When the moisture content remains constant and temperature increases, relative humidity decreases.

When a shower is running, the dew point is always changing and requires constant monitoring and recalculation. The dew point is dependent upon the interaction of the mirror surface temperature, the ambient humidity (relative humidity) and the ambient air temperature which are all constantly changing from one second to the next. The PID controller 150 needs to recalculate and adapt during the process. While those of ordinary skill in the art understand that air pressure changes contribute to the dew point calculation on a macro scale, the PID controller assumes a constant air pressure, because small changes in the micro environment would not have a material impact on the dew point calculation required for the operation of the mirror defogger 110.

Figure 15:
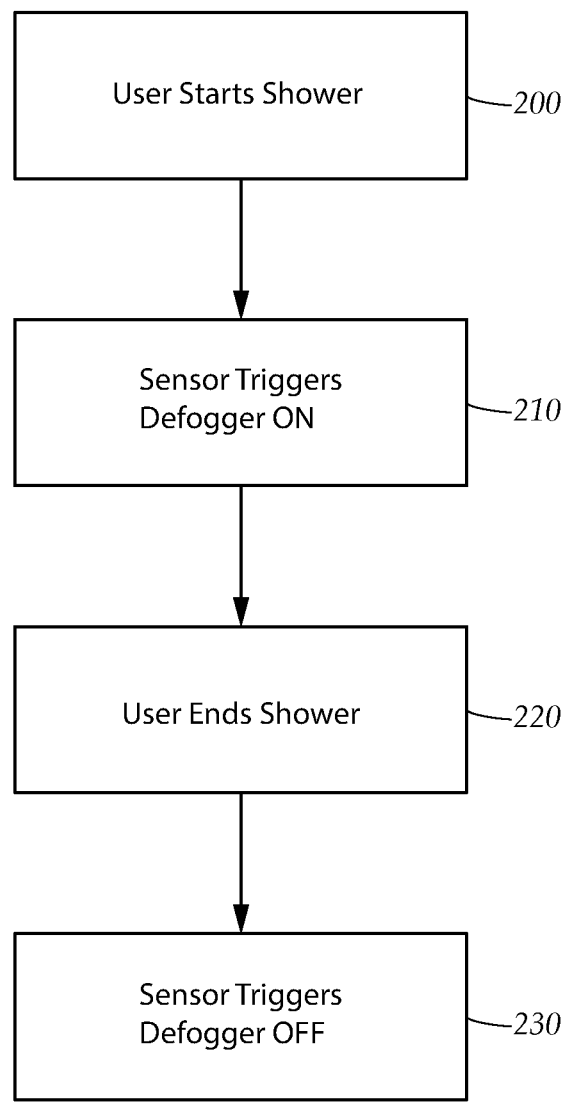
FIG. 15 is a block diagram of an example embodiment of a method of defogging a mirror using the mirror defogger.

In the fully automated mode, as shown in FIG. 15, in box 200 a user switches on the shower, the sensors detect the humidity and temperature and the controller calculates the dew point. When the mirror surface temperature is below the dew point, the controller determines through logic programming that the mirror will begin to collect condensate and fog over. In box 210, the controller turns on the motor and the at least one heating element based on the sensor output. In box 220, the user ends the shower. In box 230 the sensors determine when the mirror surface temperature is above the dew point from the sensor data including the mirror surface temperature sensor, and the controller shuts the motor and the at least one heating element off.

Similarly, as in box 230, the user may switch on the mirror defogger as the shower starts and the sensors determine when the mirror surface temperature is above the dew point from the sensor data including the mirror surface temperature sensor and when the mirror surface temperature is above the dew point, the controller shuts the motor and the at least one heating element off.

In these modes explained hereinabove, the batteries are quickly drained, requiring recharging as explained hereinbelow. In the power saving mode, shown in FIG. 16, the controller learns how long the average shower the user takes and how long the mirror defogger requires to defog the mirror. either the user or the sensors alert the controller that the shower has begun. The controller calculates when the mirror defogger will need to initiate the motor and the at least one heating element so that the mirror is clear when the shower ends by subtracting the average amount of time to clear the mirror, approximately three minutes, from the average shower length. This calculation provides a time delay for the mirror defogger, so that when the time delay is complete, the controller initiates the motor and the at least one heating element.

In one example embodiment, the user sets the amount of time delay using the dial switch required using a dial switch described hereinabove so that the mirror defogger has sufficient time to defog the mirror to coincide with the shower ending. In another example embodiment, the user uses a "smart home" app to set the time delay. In yet another example embodiment, the controller uses artificial intelligence to predict the amount of time delay needed.

Figure 16:
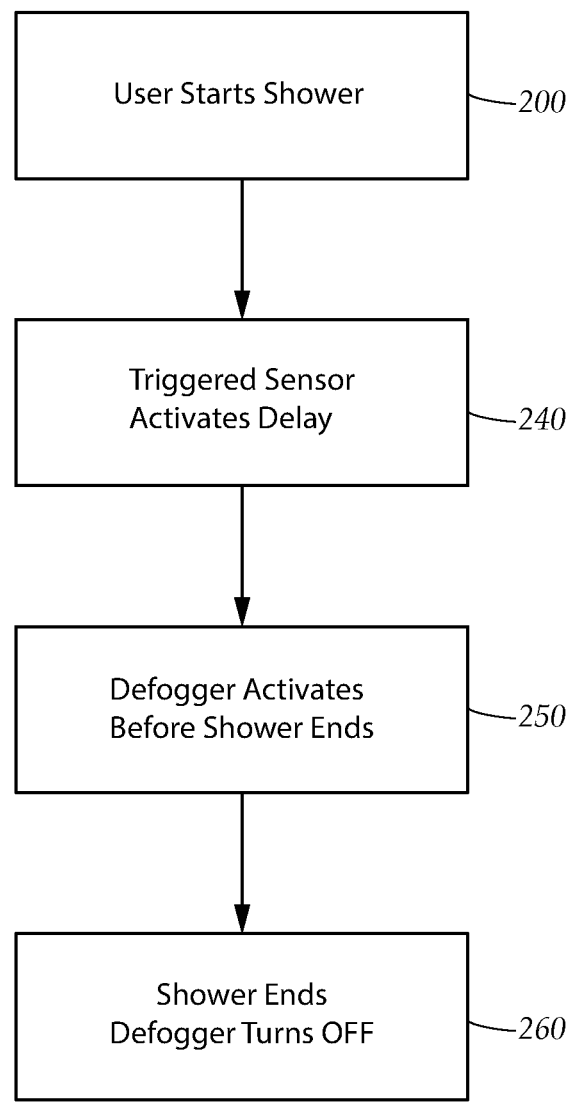
FIG. 16 is a block diagram of another example embodiment of a method of defogging a mirror using the mirror defogger.

As shown in FIG. 16, in box 200, the user starts the shower and the mirror defogger detects that a shower has begun by the controller receiving a plurality of measurements from a plurality of sensors indicating a shower has commenced. In box 240, once the mirror defogger is aware the shower has started, the controller starts the time delay that is entered into the controller by the means explained hereinabove. The controller receives the time delay equaling an average time of a shower duration less an average time to defog a mirror surface. In box 250, the motor and the at least one heating element are initiated before the shower ends, when the time delay completes. This is typically about three minutes before the shower is predicted to end. In box 260, when the shower ends, the controller turns the motor and the at least one heating element off at the predicted shower end time.

In another example embodiment, the controller does not turn off the motor and at least one heating element off at the predicted shower end time, but when the sensors indicate that the temperature of the mirror surface are above the dew point, indicated that condensation is not present.

Figure 17:
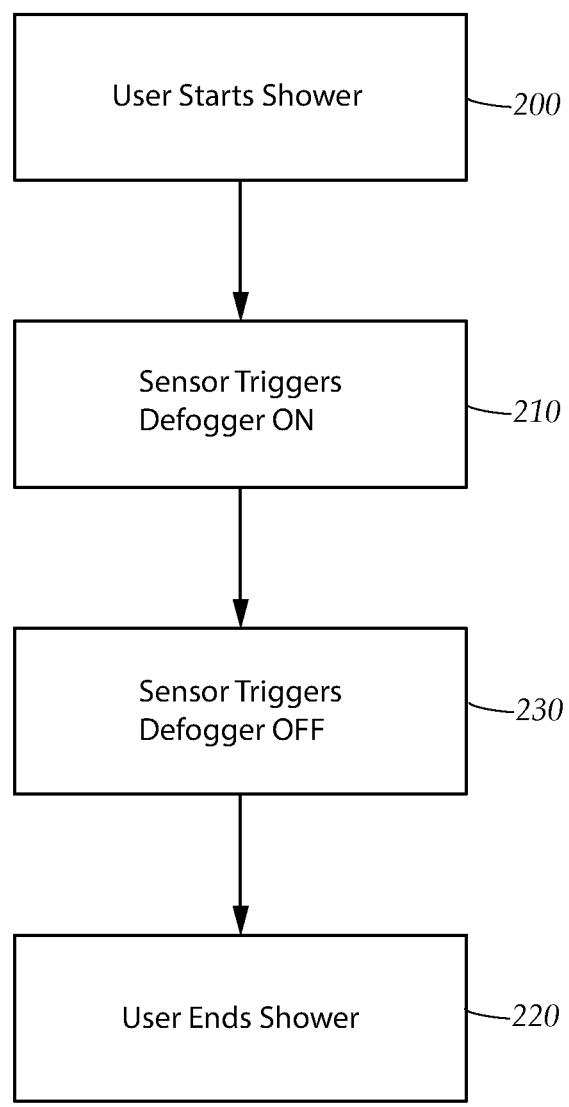
FIG. 17 is a block diagram of another example embodiment of a method of defogging a mirror using the mirror defogger.

As shown in FIG. 17, in box 200 the user starts the shower and the mirror defogger detects that a shower has started by one of the plurality of sensors. The controller receives a plurality of measurements from the plurality of sensors, including but not limited to humidity and temperature. The controller calculates the dew point. When the mirror surface temperature is below the dew point, the controller determines through logic programming that the mirror will begin to collect condensate and fog over. In box 210, the controller turns on the motor and the at least one heating element based on the sensor output. In box 230, the sensors determine when the mirror surface temperature is above the dew point from the sensor data including the mirror surface temperature sensor, and the controller shuts the motor and the at least one heating element off. In box 220, the user ends the shower.

Figure 18:
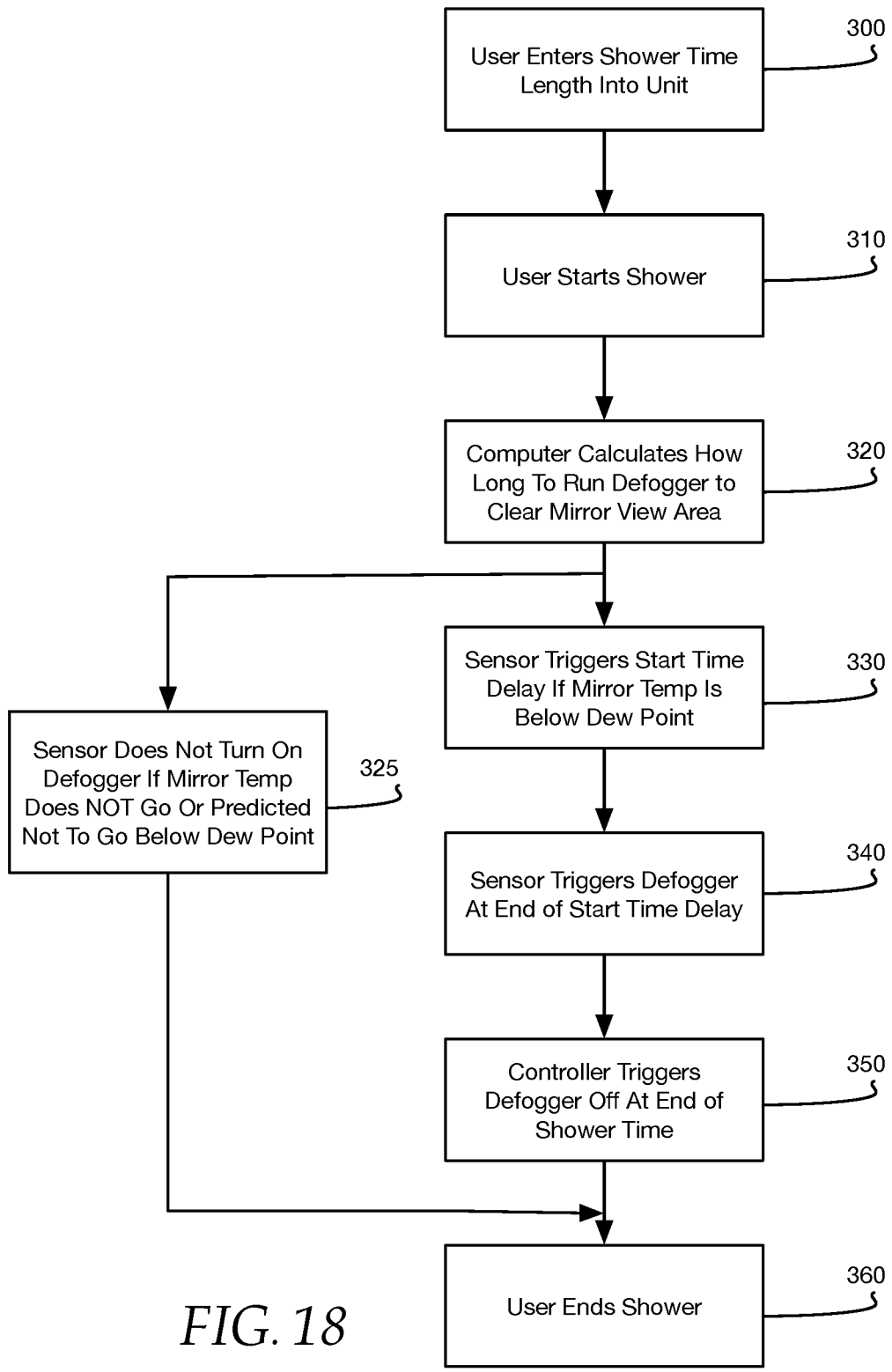
FIG. 18 is a block diagram of another example embodiment of a method of defogging a mirror using the mirror defogger.

As shown in FIG. 18, in box 300, the user enters the shower time length into the mirror defogger, or via a remote device or a "smart home" app. In box 310, the user starts the shower. In box 320, the controller receives the shower time length and calculates the time needed for the mirror defogger to clear the mirror view area. The controller calculates a start time delay equaling the shower time length less the time needed for the mirror defogger to clear the mirror view area surface. In box 325, the sensor does not signal to the controller to turn on the mirror defogger if the mirror temperature does not go below or is predicted to go below the dew point. In box 330, the controller triggers the start time delay if the mirror temperature is below the dew point, or if the mirror temperature is predicted to go below the dew point. In box 340, the sensor triggers the defogger on, initiating the motor and the at least one heating element when the start time delay completes. The controller turns the motor and the at least one heating element off when the shower time completes in box 350. If the mirror temperature does not go below the dew point, nor is predicted to go below the dew point, the sensor does not turn on the defogger. In box 360, the user ends the shower.

It is known in the art that sensors draw power even when the heating element or the motor is off. To conserve power, in another embodiment, a mounting sensor 405 is configured to detect if the mirror defogger 400 is mounted onto the mirror surface. To reduce power consumption, the mirror defogger may remain in a powered-down state in which only the mounting sensor 405 is powered. Once the mounting sensor detects the mirror defogger is mounted, the plurality of sensors run continuously. The mounting sensor 405 may periodically cycle through powered on and off periods either through a pre-determined time-interval setting, or by a "smart" device which knows the user's showering habits. Activation of mounting sensor 405 may trigger other sensors, time delays, the motor or the at least one heating element as set forth in prior embodiments.

Figure 19:
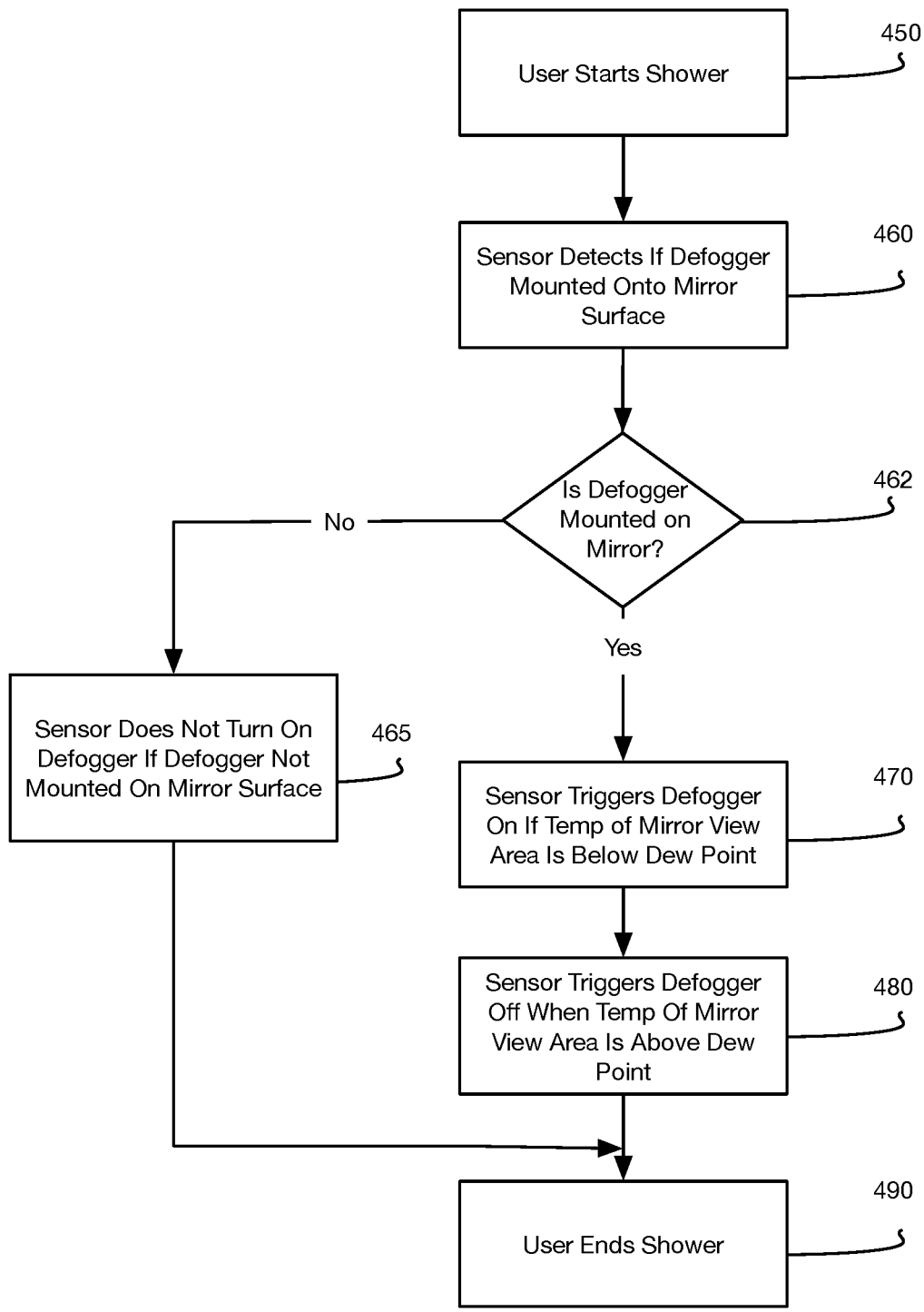
FIG. 19 is a block diagram of another example embodiment of a method of defogging a mirror using the mirror defogger.

As shown in FIG. 19, in box 450, the user starts the shower. In box 460, the mounting sensor detects if the defogger is mounted onto the mirror surface. As shown in box 462, if the defogger is mounted onto the mirror, the mounting sensor is activated and the controller receives a plurality of measurements from the plurality of sensors, including but not limited to humidity and temperature. If the mirror defogger is not mounted, the sensor does not turn on the mirror defogger as shown in box 465. The controller calculates the dew point. When the mirror surface temperature is below the dew point, the controller determines through logic programming that the mirror will begin to collect condensate and fog over. In box 470, the controller turns on the motor and the at least one heating element based on the sensor output. In box 480, the sensors determine when the mirror surface temperature is above the dew point from the sensor data including the mirror surface temperature sensor, and the controller shuts the motor and the at least one heating element off. If the mounting sensor is not activated, the controller does not trigger any sensors, motors, time delays or heating elements. In box 490, the user ends the shower.

As shown in FIGS. 20A and 20B, the mounting sensor 405 is affixed to the rear surface 410 of the mirror defogger 400 which faces the mirror surface. The rear surface 410 may have a recess 406 in the shape mounting sensor 405 to allow for the lip 420 to sit in the recess 406. The mirror defogger 400 may also have at least one electrode 408 disposed in the recess 406, the electrode 408 aligning with at least one contact 412 of the mounting sensor 405. When the mounting sensor 405 is placed in the recess 406, the inner surface 414 of the mounting sensor 405 contacts the recess 406. The at least one contact 412 does not contact the electrode 408 unless the mounting sensor 405 is pressed against the mirror surface by mounting the mirror defogger 400 onto the mirror.

Figure 21A:
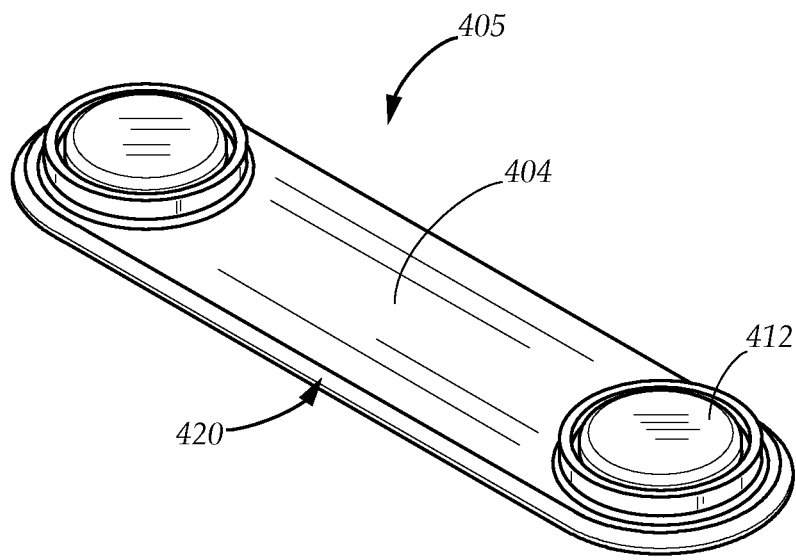
FIG. 21A is a bottom perspective view of a mounting sensor of an example embodiment of a tube assembly of a mirror defogger.
Figure 21B:
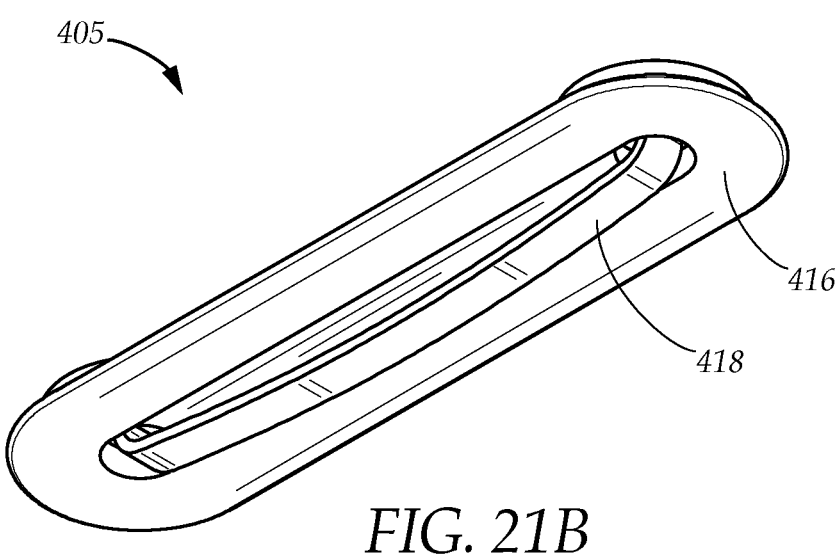
FIG. 21B is a top perspective view of a mounting sensor of an example embodiment of a tube assembly of a mirror defogger.
Figure 22:
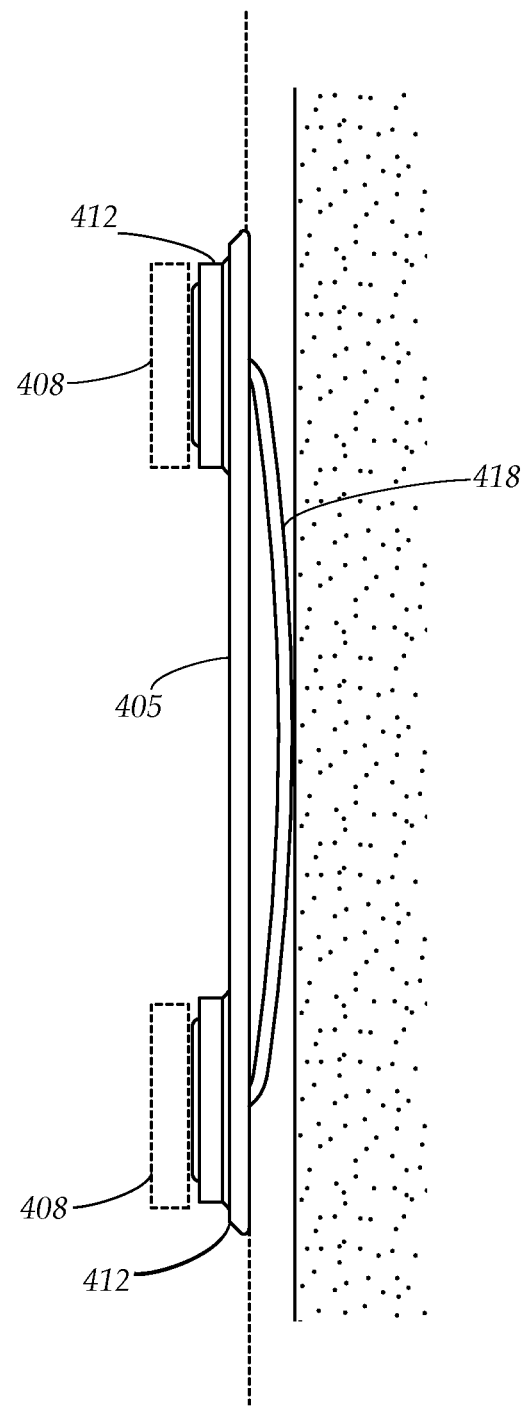
FIG. 22 is a side perspective view of a mounting sensor of an example embodiment of a tube assembly of a mirror defogger.

As shown in FIGS. 21A, 21B and 22 the mounting sensor 405 has an inner surface 404, a lip 420 and outer surface 416. Two of the contacts 412 are connected by an electrically conductive biasing element 418. The biasing element protrudes through the outer surface 416. As the mounting sensor 405 is pressed against the mirror surface, the biasing element 418 deforms and pushes the two contacts 412 toward the electrodes 408, closing a circuit between the two electrodes 408, through the two contacts 412 and the biasing element 418. Thus, by mounting the mirror defogger 400, the controller of the mirror defogger 400 is able to determine if the device is mounted onto the mirror.

In yet another example embodiment, the mounting sensor may be a contact switch. The body of the contact switch may be disposed inside the mirror defogger, the contact switch facing being disposed toward the mirror surface, having the stem of the contact switch protruding out of the mirror defogger. The stem being sufficiently long enough to depress when the mirror defogger is mounted onto the mirror surface. In other embodiments the contact switch may be disposed on the mirror defogger.

In yet another example embodiment, the speed of the impeller is variable and controlled by the controller, where the controller is a PID controller and the sensors input allows the speed to be adjusted based on feedback from the sensors, optimizing the battery life of the mirror defogger. The controller adjusts the motor power output as the plurality of sensors indicate the ambient temperature and the ambient humidity rise toward the dew point.

In the example embodiment where the controller is a PID controller, the input of the sensors allows the at least one heating element and the motor to optimally bring the mirror surface temperature above the dew-point temperature through the feedback loop of the controller. The PID may use artificial intelligence and the "smart home" app on a smart phone to track the showering patterns of various users and set delays based on the user identifying his or her self or as a guest.

Figure 12:
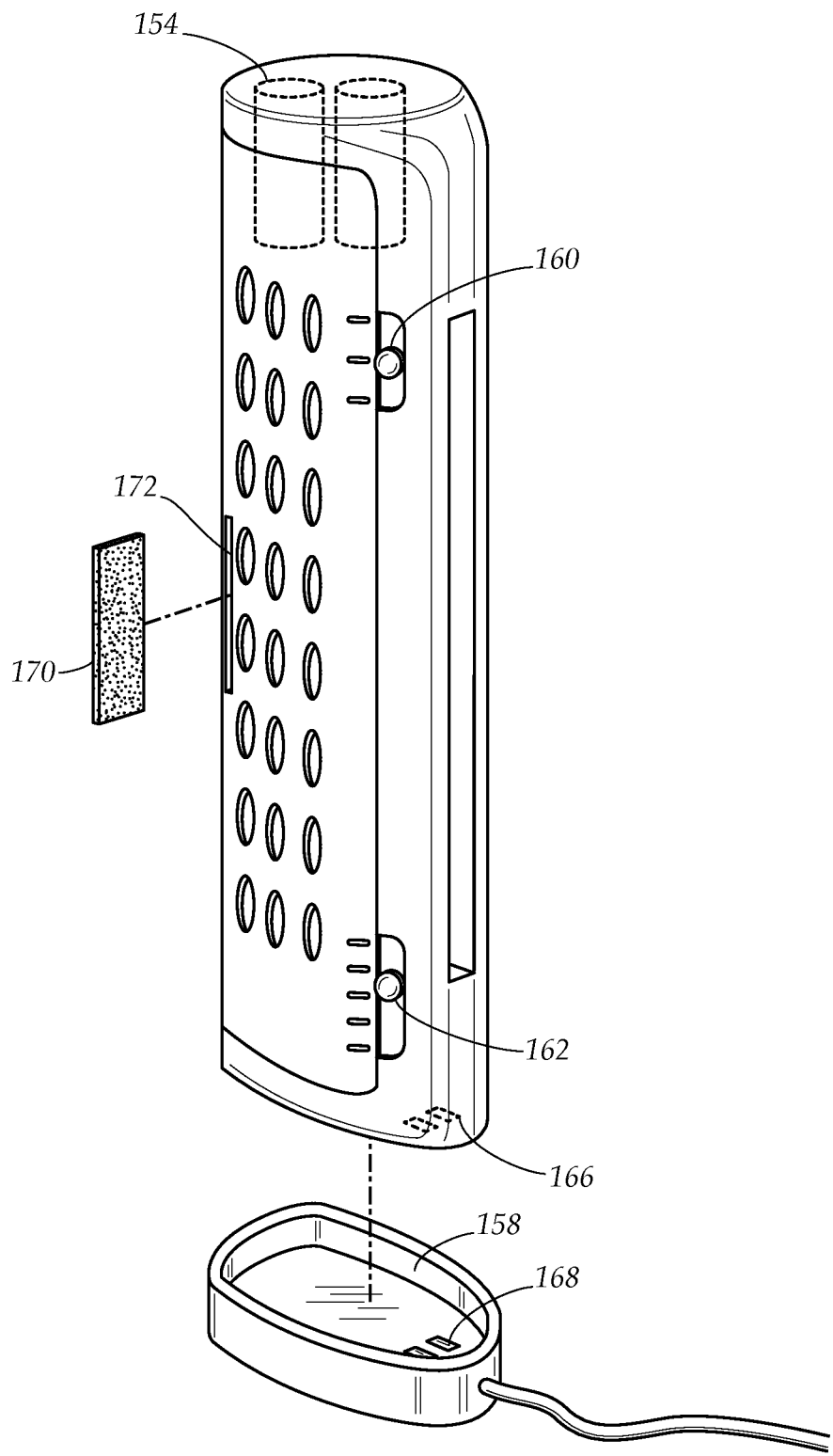
FIG. 12 is a perspective of yet another example embodiment of the tube with a charging station.

Referring to FIG. 12, yet another example embodiment of the mirror defogger 110 with a different configuration. A switch 160 having settings for off, on and automatic is on the tube. Instead of the dial switch shown in the other drawings, a slide switch 162 for setting the time delay is on the tube 120. When the batteries in the battery compartment 154 require recharging, the tube is placed in a charging dock 158, the tube 120 having the contact point 166 to match a contact 168 in the charging dock. While not shown, it is understood by those of ordinary skill in the art, that one or more indicator lights such as an LED light 164 may be present on the tube indicating the battery power available or when the unit is on.

FIG. 12 also demonstrates yet another method of mounting the tube 120 to the mirror surface. A wall mount 170 is placed on the mirror surface or near an edge of the mirror surface. A recess 172 in the tube 120 slides over the wall mount 170.

Figure 9:
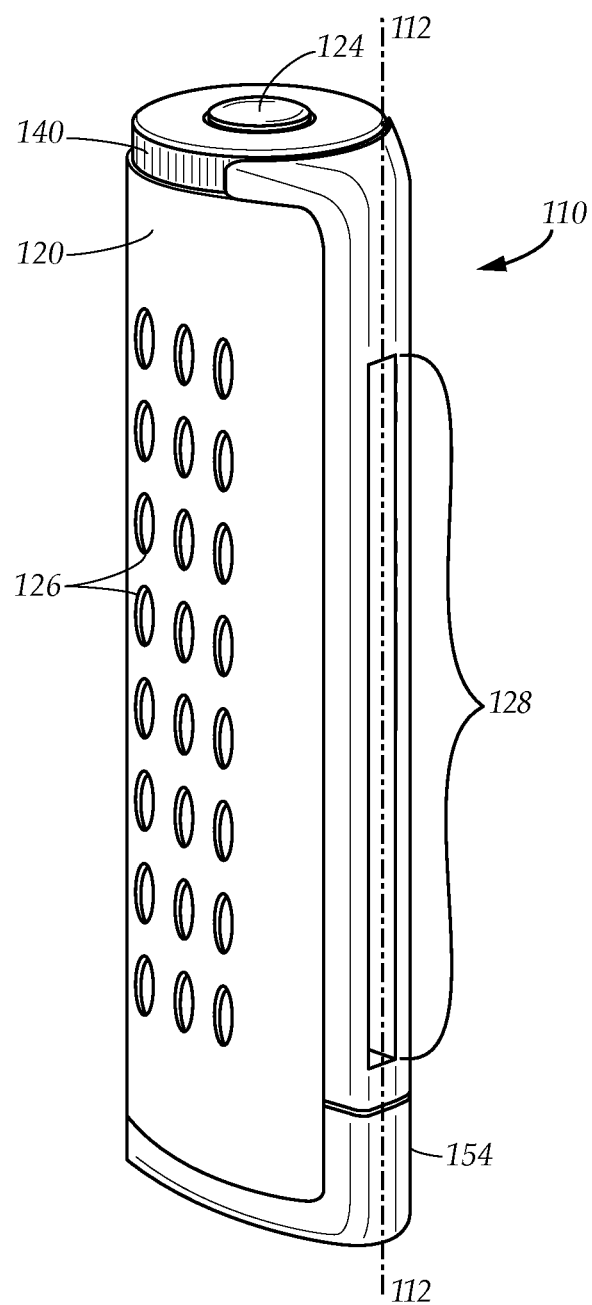
FIG. 9 is a perspective view of yet a further example embodiment of a tube assembly of a mirror defogger.
Figure 10:
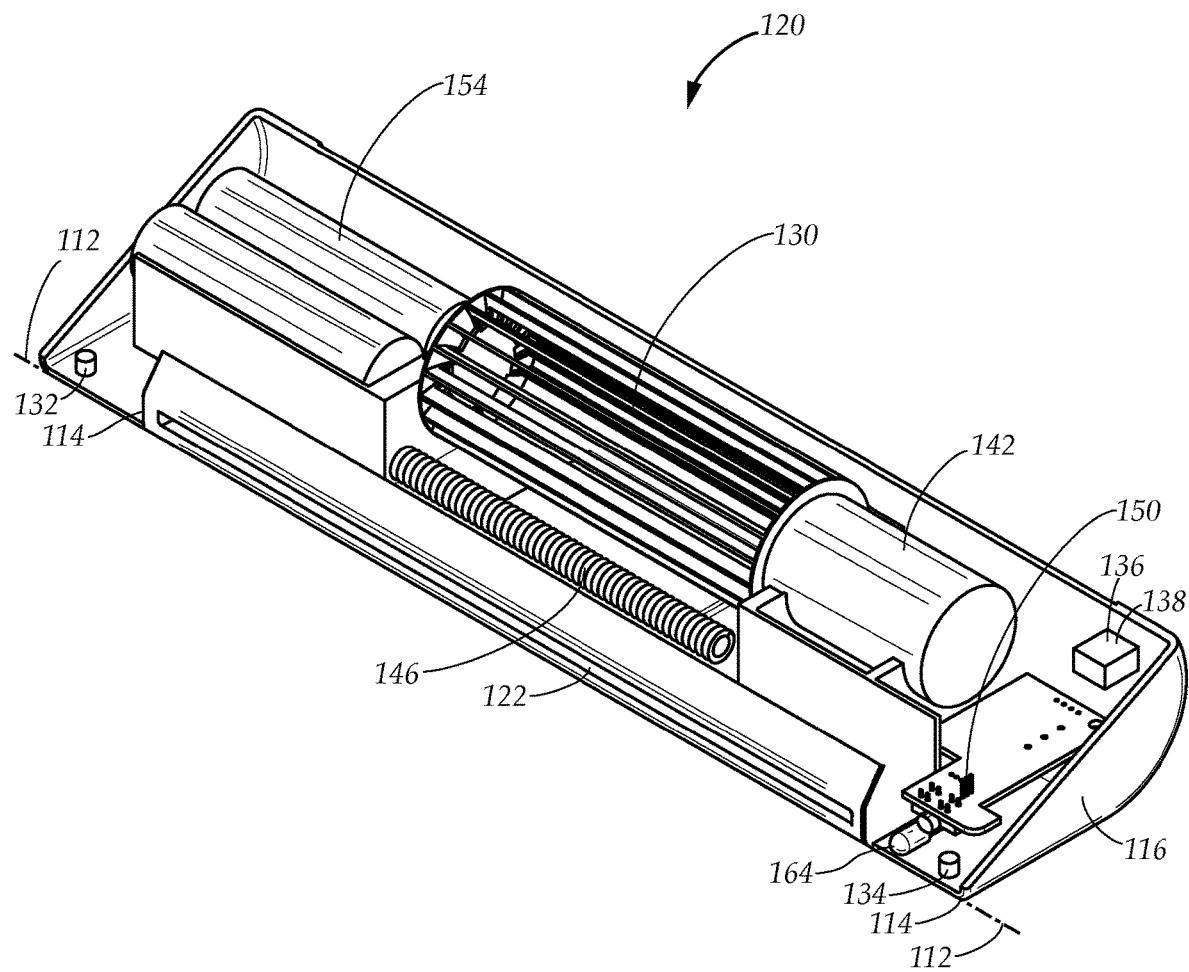
FIG. 10 is a cross-sectional view of FIG. 9, showing a plurality of components of a tube assembly of the mirror defogger.

It is understood by those of ordinary skill in the art, that the several of the features shown in FIG. 9 can be interchanged with the similar features having the same function shown in FIG. 12 within the inventive concept. Further, the mounting means described hereinabove may be interchanged for various tube configurations within the inventive concept.

As will be appreciated by one skilled in the art, aspects of the present disclosure may be embodied as a system, method or computer application. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer application embodied in one or more computer readable medium(s) having computer readable program code embodied thereon.

Aspects of the present disclosure are described below with reference to flowchart illustrations and/or block diagrams of methods, systems and computer application applications according to embodiments of the disclosure. Each block of the flowchart illustrations and/or block diagrams, and combinations of blocks in the flowchart illustrations and/or block diagrams, can be implemented by computer application instructions.

The flowchart and block diagrams in the Figures illustrate the architecture, functionality and operation of possible implementations of systems, methods and computer application applications according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All these variations are considered a part of the claimed disclosure.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a mirror defogger system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A mirror defogger for defogging a mirror surface, comprising:
    a mirror surface;
    an elongated projection having a longitudinal axis and a cross-section, the elongated projection having a vent along a first middle section of the longitudinal axis, the elongated projection having an intake along a second middle section of the longitudinal axis, the vent and the intake being nonoverlapping across the cross-section, the elongated projection having an outer surface, the elongated projection attaching to the mirror surface;
    a contact switch configured to detect if the elongated projection is mounted onto the mirror surface, the contact switch further comprising a biasing element, the biasing element having a pair of electrical contacts, the biasing element protruding through the outer surface of the elongated projection, such that when the elongated projection contacts the mirror surface, the biasing element deforms thereby pushing the pair of electrical contacts to close the contact switch;
    a tangential impeller powered by a motor, the tangential impeller inside the elongated projection opposite the vent;
    at least one heating element inside the elongated projection between the tangential impeller and the vent;
    a plurality of sensors inside the elongated projection, the sensors outputting a plurality of measurements of conditions outside the mirror defogger, the plurality of sensors further comprising a first sensor, the first sensor a contactless infrared temperature sensor measuring the mirror surface temperature, a second sensor an ambient temperature sensor and a third sensor an ambient humidity sensor; and
    a programmable controller having input from said plurality of sensors, the programmable controller calculating a dew point from said input in a control loop feedback configured for controlling the motor and the at least one heating element, initiating said motor and said at least one heating element when the mirror surface temperature is below the dew point and terminating said motor and said at least one heating element when the mirror surface temperature is above the dew point.

2. The mirror defogger as described in claim 1, wherein the elongated projection attaches to the mirror surface with the vent disposed toward the mirror surface.

3. The mirror defogger as described in claim 2, wherein the plurality of sensors measure continuously when the contact switch has contacted the mirror surface.

4. The mirror defogger as described in claim 2, wherein the motor and the at least one heating element will not initiate unless the contact switch has contacted the mirror surface.

5. The mirror defogger as described in claim 2, wherein the motor and the at least one heating element are terminated when the contact switch no longer contacts the mirror surface.

6. A method of conserving power of a mirror defogger, comprising:
    detecting if a mirror defogger is mounted onto a mirror surface by a contact switch configured to detect if the mirror defogger is mounted onto the mirror surface, the contact switch further comprising a biasing element protruding through an outer surface of an elongated projection of the mirror defogger, the biasing element having a pair of electrical contacts, such that when the elongated projection contacts the mirror surface, the biasing element deforms thereby pushing the pair of electrical contacts to close the contact switch, thereby completing a circuit;
    initiating at least one sensor of the mirror defogger when the contact switch is closed; and
    terminating at the at least one sensor when the mirror defogger is not mounted from the mirror surface when the contact switch is open.

* * * * *